United States Patent [19]
Galchefski

[11] Patent Number: 5,362,279
[45] Date of Patent: Nov. 8, 1994

[54] SELF-TENSIONING CHAIN DRIVE

[75] Inventor: John M. Galchefski, Larkville, Pa.

[73] Assignee: CMS Gilbreth Packaging Systems, Trevose, Pa.

[21] Appl. No.: 102,458

[22] Filed: Aug. 5, 1993

[51] Int. Cl.⁵ .............................................. F16H 7/10
[52] U.S. Cl. .................................... 474/112; 474/134
[58] Field of Search ............... 474/101, 102, 107, 108, 474/112, 133–135, 137, 273

[56] References Cited

U.S. PATENT DOCUMENTS

| | | | |
|---|---|---|---|
| 1,567,494 | 12/1925 | Fahrney | 474/101 |
| 3,166,947 | 1/1965 | Hendershot | 474/137 |
| 3,574,287 | 4/1971 | Heidacker | 74/242.1 |
| 3,776,052 | 12/1973 | Campbell, Jr. | 74/230.17 A |
| 3,906,810 | 9/1975 | Glendening | 74/395 |
| 3,926,063 | 12/1975 | Mayfield | 474/137 X |
| 3,939,723 | 2/1976 | Helm | 74/401 |
| 3,945,262 | 3/1976 | Griffin | 74/219 |
| 4,192,705 | 3/1980 | Wech | 74/84 R X |
| 4,614,507 | 9/1986 | Ishino | 474/101 |
| 4,759,739 | 7/1988 | Weir | 474/49 |
| 4,810,236 | 3/1989 | Kumm | 474/101 |
| 4,836,101 | 6/1989 | Kato | 100/215 |
| 4,877,346 | 10/1989 | Guenther et al. | 74/89.2 X |
| 4,889,519 | 12/1989 | Band et al. | 474/101 |
| 4,899,703 | 2/1990 | Buferne | 474/101 X |
| 4,929,218 | 5/1990 | Clough | 474/101 X |
| 4,942,777 | 7/1990 | Fife | 74/397 |
| 5,067,581 | 11/1991 | Nicol | 180/254 |
| 5,209,133 | 5/1993 | Ballard | 474/101 X |

Primary Examiner—Roger J. Schoeppel
Attorney, Agent, or Firm—Morgan & Finnegan

[57] ABSTRACT

A chain drive is described in which the chain travel length remains constant, as well as the chain tension, in spite of changes in separation between the driving and driven sprockets. Eccentric idlers enable the chain to be initially tensioned by offsetting these eccentric idlers through a sufficient distance to establish the proper chain tension. An idler sprocket provides a pivot for the two arms that support the chain drive, thereby enabling the arms to form a "V" configuration as the linear separation of the driving and driven sprockets, mounted on opposite ends of their respective arms, is varied. The eccentric idlers wrap the chain around at least a portion of the idler sprocket's driven and driving sides.

3 Claims, 5 Drawing Sheets

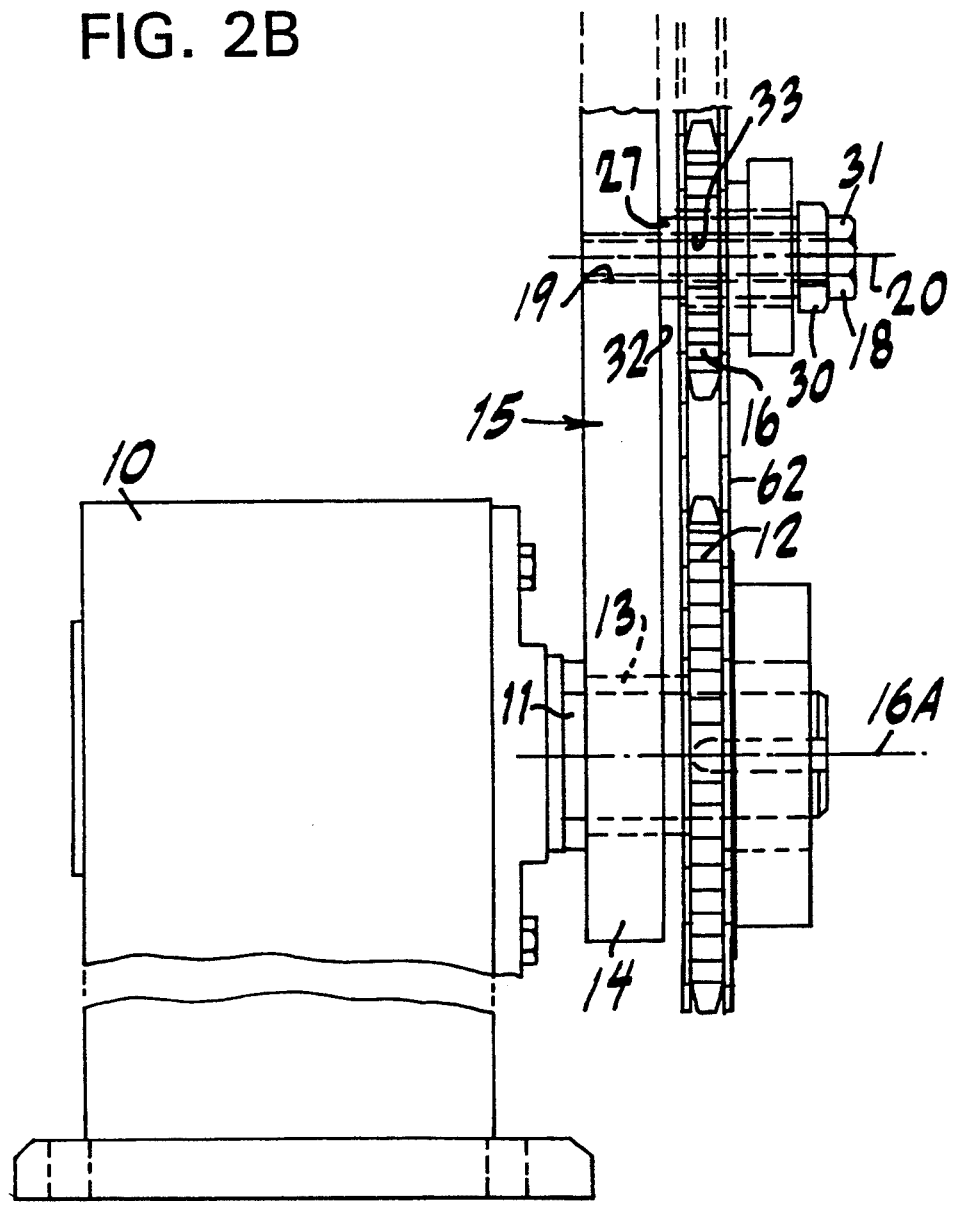

SELF-TENSIONING CHAIN DRIVE

TECHNICAL BACKGROUND

This invention relates to drive mechanisms and more particularly to a chain drive that establishes a constant chain travel distance between the driving sprocket and the driven sprocket to accommodate automatically a range of driving and driven sprocket separations, and the like.

BACKGROUND ART

Power transmission mechanisms have been developed through the years to transmit power from a driving gear, or driving sprocket, through a chain to a driving gear, or driven sprocket. Frequently, it has been necessary to interpose an idler between the driving and driven sprockets in order, for example, to negotiate a change in power transmission direction or to provide a degree of slack adjustment in order to maintain proper chain tension.

There also is a need to adjust the separation between the driving and the driven sprockets in order, for instance, to accommodate changes in product size and production machinery rearrangements. Clearly, there is a practical limit to the separation between the driving and driven sprockets that occurs when the axes of rotation for these sprockets are in a linear alignment. As it becomes necessary, however, to reduce this separation, as for example, to change the drive mechanism to accommodate a smaller separation between the driving sprocket and the machinery associated with the driven sprocket, the chain, or chains, that actually transfer the power to the driven sprocket become slack. To absorb this slack in order to keep the chain properly meshed with the driving and driven sprockets, an idler sprocket usually is mounted between the driving and driven sprockets. The idler sprocket also is meshed with the chain, the axis of rotation for the idler sprocket, moreover, being movable relative to the driving and driven sprocket axes in order to absorb the slack in the chain that is created through the reduced separation between the driving and driven sprockets.

These changes in position, not only between the driving and driven sprockets, but also with respect to the idler sprocket require time consuming adjustments by a skilled mechanic. These adjustments, in addition to imposing production delays and requiring the services of a technician, if not executed properly will lead to a disengagement between the chain and the teeth on one or more of the sprockets, thereby creating even more delay until the correct combination of sprocket separation adjustments is achieved.

Accordingly, there is a need for a power transmission mechanism in which the separation between the driving and the driven sprockets can be changed while automatically maintaining a tension on the chain that is adequate to prevent disengagement between the chain and the teeth of one or more of the drive mechanism sprockets.

DESCRIPTION OF THE INVENTION

These and other inadequacies that have characterized the prior art are overcome, to a great extent, through the practice of the invention. Illustratively, a driving sprocket is mounted at one end of an arm and the driven sprocket is mounted at the end of another arm. Both of these arms are joined in accordance with the invention, at their respective opposite ends by means of an idler sprocket. The driving and driven sprocket arms, at their common junction with the idler sprocket, are able to flex within a given range of motion, within a general "V" shaped configuration in which the common junction and the idler sprocket are at the apex of the "V".

Thus, as the driven sprocket is shifted in a linear direction toward the driving sprocket to reduce separation between the driving and driven sprockets, the axis of rotation for the idler sprocket moves through an arc of a circle that has the driving sprocket's axis of rotation as its center. This movement of the idler sprocket, in accordance with a feature of the invention, maintains a constant chain travel distance among the three sprockets. But first to establish an initial chain tension and then to maintain automatically a constant chain tension, a pair of adjustably offset eccentric idlers are each mounted for rotation on a respective one of the arms at about half of the distance between the idler sprocket and the associated driving or driven sprockets. By suitably offsetting the eccentric idlers, the desired initial chain tension is developed. In this manner, the eccentric idlers each engage the chain and wrap a portion of the chain on both the driving and driven sides of the idler sprocket, thereby automatically establishing a proper chain tension and always keeping a portion of the chain in contact with the idler sprocket in spite of variations in the linear separation between the driving and driven sprockets.

Consequently, in accordance with another aspect of the invention, the mechanism automatically adjusts to changes in the separation between the driving and driven sprockets, and the need to manually tinker with the idler sprocket position that characterized the prior art, has been eliminated.

These and other features of the invention will be better understood through a study of the following detailed description of a specific embodiment of the invention. The scope of the invention, however, is limited only through the claims appended hereto.

BRIEF DESCRIPTION OF THE DRAWING

FIGS. 2A and 2B, placed end-to-end, are a side elevation of the embodiment of the invention that is shown in FIG. 1.

DETAILED DESCRIPTION OF THE INVENTION

Figure 2A:
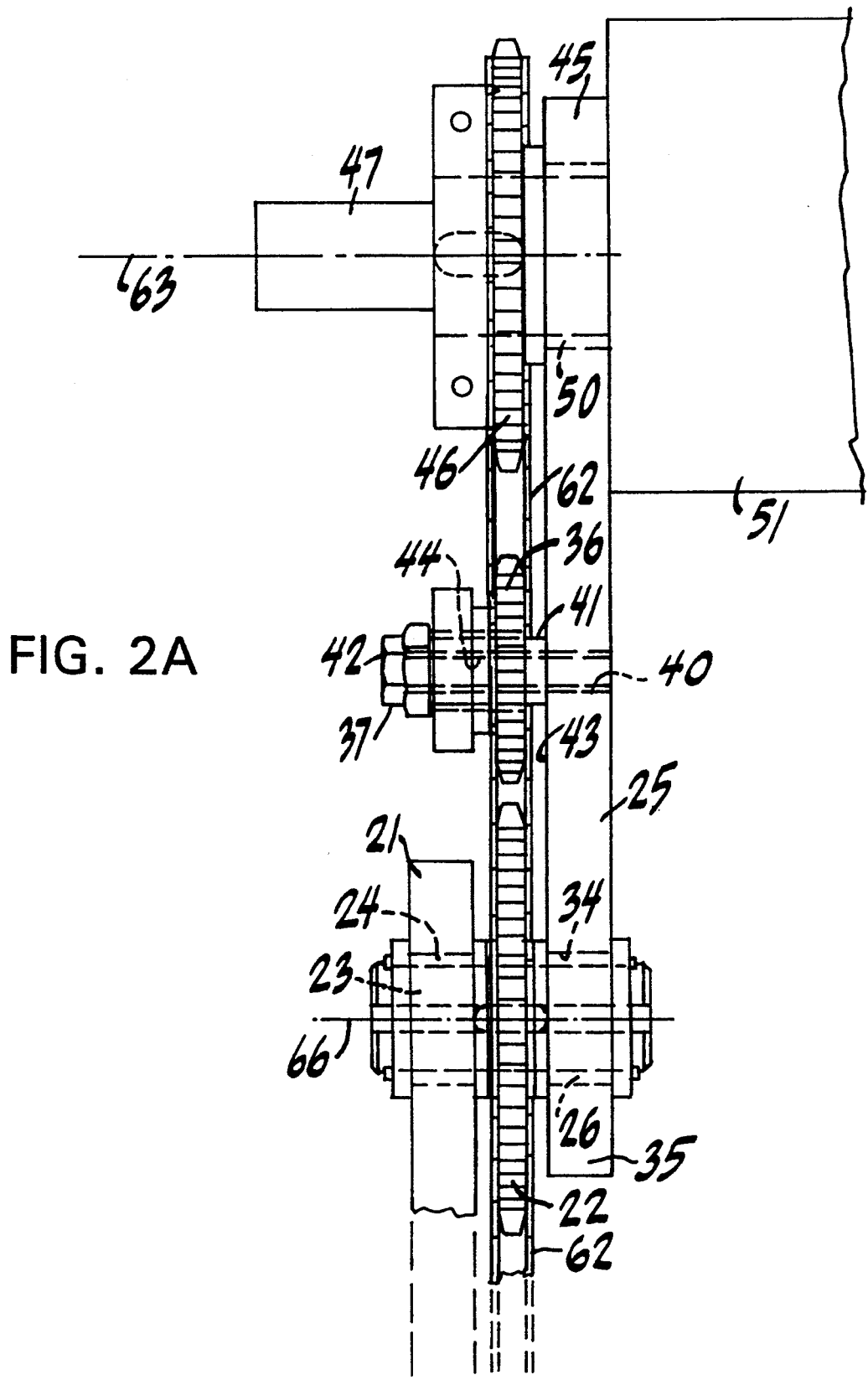
Figure 3:
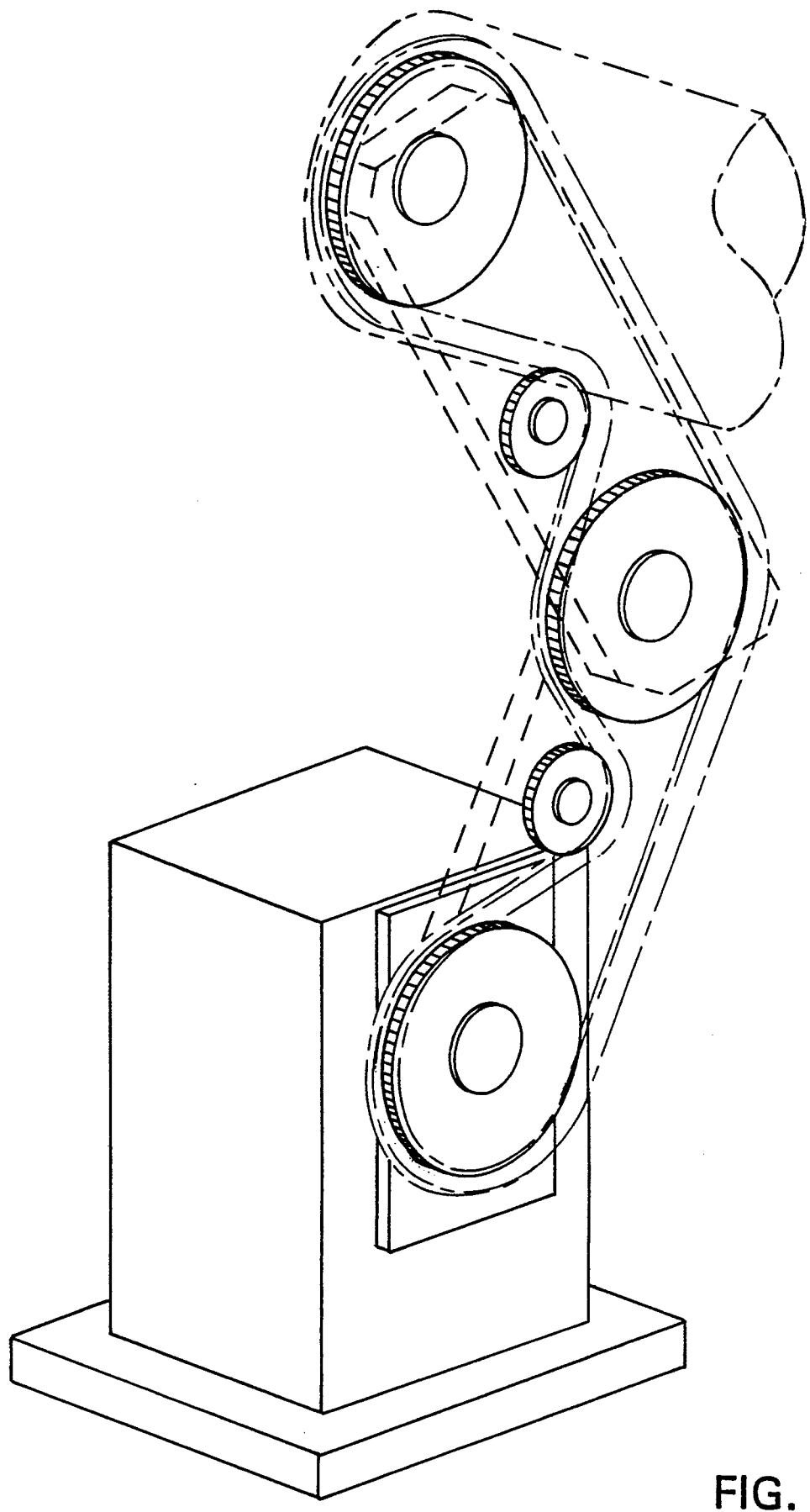
FIG. 3 is a perspective view of the apparatus illustrated in FIGS. 2A and 2B, combined into a single figure, in order to present the invention in three dimensions.

For a more detailed appreciation of the invention, attention is first invited to FIGS. 2A and 2B which show a reduction gearbox 10 that drives, through a driving shaft 11, a driving sprocket 12. Although the driving sprocket 12 is secured to the driving shaft 11 in order to rotate with that shaft, the shaft 11 also is journalled in a journal bearing 13. the journal bearing 13, moreover, is mounted in a driving end 14 of a generally rectangular driving arm 15 that is positioned between the driving sprocket 12 and the gearbox 10, parallel with the driving sprocket's plane of rotation.

As shown in combined FIG. 2B, the driving sprocket 12 has an axis of rotation 16A that is coincident with the longitudinal axis of the driving shaft 11.

Figure 1A:
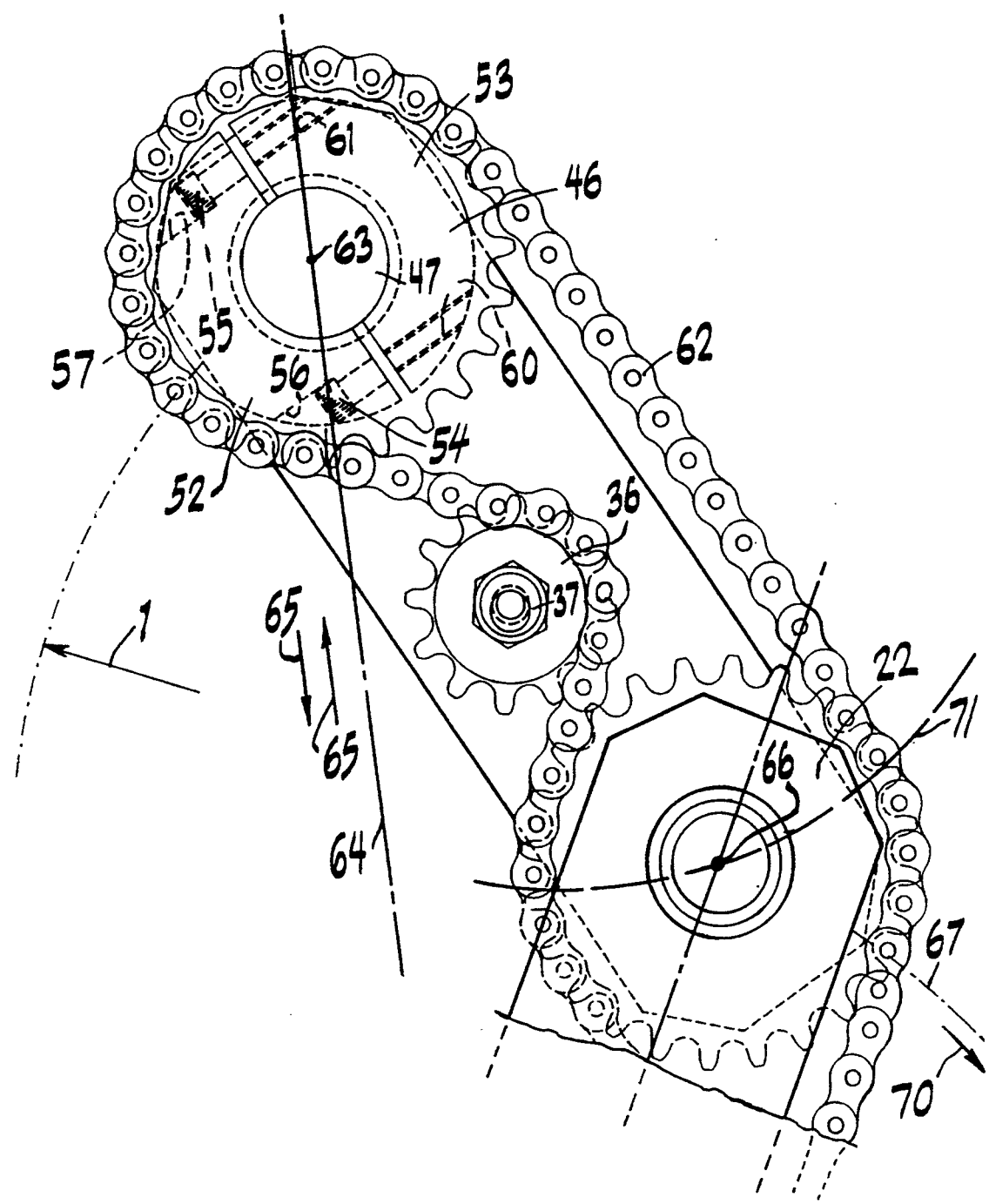
FIGS. 1A and 1B, placed end-to-end, are a plan view of a typical embodiment of the invention.
Figure 1B:
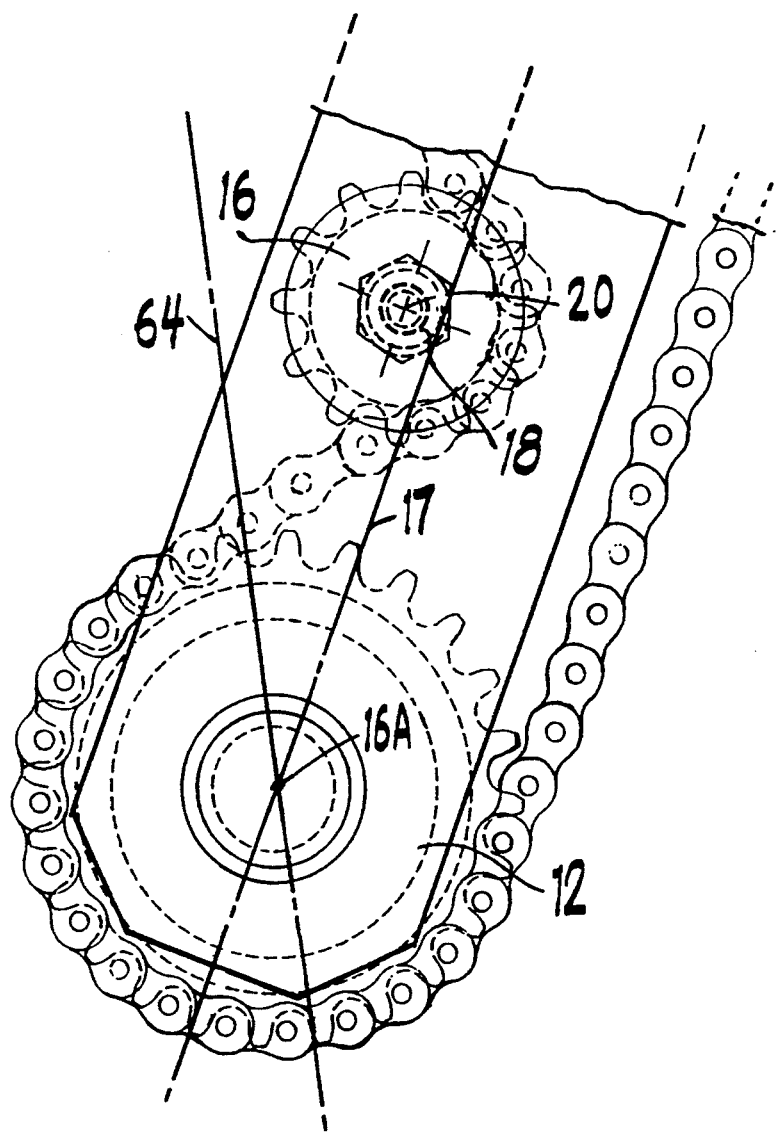

At about the middle of the driving arm 15 a driving eccentric idler 16 is rotatably mounted, with the eccentric idler in the same plane of rotation as the driving sprocket 12. In FIG. 1B, however, it can be seen that the driving eccentric idler 16 is slightly offset in a transverse direction relative to driving arm longitudinal centerline 17. Thus, as seen in FIG. 1A, driving eccentric idler axis of rotation 20 is spaced slightly to one side of the centerline 17, in a transverse direction, relative to the driving sprocket 12.

In accordance with a salient feature of the invention, the axis of rotation 20 for driving eccentric idler 16 can be shifted to make initial and run-in tension adjustments as described subsequently in more complete detail. For instance, and as best shown in FIG. 2B of the drawing, a bolt 18 serves as a fastener for a special bushing 27. The special bushing 27, moreover, provides an axle for the driving eccentric idler 16. The bolt 18, as illustrated, is received in a tapped bore 19 that is formed approximately in the middle of the driving arm 15. As also shown in the drawing, the special bushing 27 has an hexagonal head 30 that is clamped between head 31 on the bolt 18 and opposite surface 32 of the driving arm 15. The special bushing 27 has an eccentric bore 33, relative to the longitudinal axis of the bushing, that is, as shown in the drawing, appreciably larger in diameter than the corresponding portion of the shank of the bolt 18 that serves as the fastener for the idler 16. The driving eccentric idler 16 also is mounted on the outer surface of the special bushing 27 for rotation relative to the bushing.

Thus, to adjust the offset for the driving eccentric idler 16, the bolt 18 is loosened. A suitable force is applied to the special bushing's hexagonal head 30 in a plane that is parallel with the plane of rotation for the driving eccentric idler 16 in order to move the special bushing and the associated eccentric idler in a desired distance and direction. The distance through which the special bushing 27 can be moved is limited only through the amount of the eccentricity, or the distance between the longitudinal axis of the bushing and the central axis of the bore 33.

Upon establishing the desired offset for the driving eccentric idler 16, the bolt 18 is tightened in order to clamp the special bushing 27 in place between the bolt head 31 and the surface 32 of the driving arm 15.

The driving arm 15 has, at the longitudinal end opposite to the driving end 14, an idler end 21 (FIG. 2A), in which a freely rotatable idler sprocket 22 is mounted in the same plane of rotation as the driving sprocket 12 and the driving eccentric idler 16. Illustratively, the idler sprocket 22 has a shaft 23 that is journalled in a driving arm idler sprocket bearing 24.

Spaced from the idler sprocket 22, and on the side of the idler sprocket 22 that is opposite to the driving arm 15, a generally rectangular driven arm 25 is mounted in a position that places the idler sprocket between the driving and driven arms. The driven arm 25, further, is pivotally mounted to the shaft 23 of the idler sprocket 22 in order to enable the driven arm 25 to move relative to the driving arm 15 in a plane that is parallel to the idler sprocket. To achieve this purpose, the idler sprocket shaft 23 is received in a journal bearing 26 that is seated in a bore 34 formed in an idler sprocket end 35 of the driven arm 25.

In about the mid-portion of the driven arm 25, a driven eccentric idler 36 is mounted for rotation in the same plane of rotation as that established by the driving sprocket 12, the driving eccentric idler 16 and the idler sprocket 22. The general construction, moreover, of the driven eccentric idler 36 is essentially the same as that described above with respect to the driving eccentric idler 16.

Thus, the driven eccentric idler 36 also has a fastener, or bolt 37 that is received in a tapped bore 40 formed in the driven arm 25. A special bushing 41 is clamped between an hexagonal head 42 that is formed on the bolt 37 and opposite surface 43 of the driven arm 25. The bushing 41 has an eccentric bore 44 that has a diameter greater than the diameter of the corresponding portion of the shank of the bolt 37. Further in this connection, the driven eccentric idler 36 is rotatably mounted on the outer surface of the special bushing 41.

Accordingly, the driven eccentric idler 36 is offset relative to the bolt 37 by releasing the bolt, forcing the special bushing 41 in a direction and through a distance to produce the necessary tension as described subsequently in more complete detail. Upon establishing the proper offset for the idler 36, the special bushing 41 is fixed in position by tightening the bolt 37 in order to clamp the special bushing between the hexagonal head 42 and the surface 43 of the arm 25.

A driven end 45 is provided on the driven arm 25 that is opposite to the idler sprocket end 35. A driven sprocket 46 is secured to a driven shaft 47, which shaft is rotatably journalled in a bearing 50 to enable the shaft to deliver rotational power to a driven member or turret shaft 51.

Turning now to FIG. 1A, it can be seen that the driven sprocket 46 is clamped to the shaft 47. The driven sprocket 47 is divided into two sprocket halves 52,53 that are clamped together by means of Allen cap screws 54,55. The screws 54,55 are received in bores 56,57 that are formed in the sprocket half 52, the bores being in a plane that is parallel to the plan of rotation for the sprockets and eccentric idlers. Tapped bores 60,61 are formed in the sprocket half 53 in respective alignment with the bores 56,57 to receive the threaded shanks of the Allen cap screws 54,55. By placing the driven sprocket 46 on the driven shaft 47 and tightening the Allen cap screws 54,55 both sprocket halves 52,53 are clamped to the driven shaft 47 in order to secure the driven sprocket 46 to the surface of that shaft.

A continuous chain 62 is engaged with teeth on the sprockets 12,22 and 46, as well as teeth on the eccentric idlers 16 and 36.

In operation, the initial tension in the chain 62 is adjusted by loosening the bolts 18 and 37, respectively, for the eccentric idlers 20 and 36. The special bushings 27 and 41 (FIGS. 2A and 2B) are pressed with appropriate force to develop the proper tension in the chain 62 and to wrap the chain around an adequate arc of the idler sprocket 22 (FIG. 1A) in which there is some degree of sprocket engagement with the chain on sides of the idler sprocket opposite to the driving sprocket 12 (FIG. 1B) and the driven sprocket 46.

The bolts 18 and 37 are then tightened, when a suitable chain tension has been established, to clamp the associated special bushings 27 and 41 in place. In this manner, a constant travel distance for the chain 62 is provided, thereby maintaining equal tension on the chain, for any linear separation between the driving and driven sprockets 12,46.

After the drive mechanism has been operated for a suitable "run-in" period, the chain 62 tension should be checked and, if some slack has developed, this slack can be compensated through another adjustment to the eccentric idlers 16,36 to restore the desired chain tension.

Further adjustments to the chain tension, the position of the idler sprocket 22 and the like are not required, in accordance with this invention, in spite of any changes that might be made to the linear separation between the driving sprocket 12 and the driven sprocket 46.

The separation between axis of rotation 63 for the driven sprocket 46 and the fixed position of the axis of rotation 16A for the driving sprocket 12 is adjusted by moving the driven sprocket along line 64 in the directions of arrows 65. As the driven sprocket 46, for example, is moved along the line 64 toward the driving sprocket 12, axis of rotation 66 for the idler sprocket 22 moves along circular arc 67 in the direction of arrow 70. As shown in FIGS. 1A and 1B, the arc 67 is the arc that is struck by the radius formed from a line between the axes of rotation 16A and 66, with the center of the arc at the axis of rotation 16A.

In this manner the mechanism develops a "V" configuration in which the driving sprocket 12 and the driven sprocket 46 each are at their respective ends of the opposite arms of the "V," with idler sprocket 22 at the apex of the "V."

In accordance with an additional feature of the invention, for any specific separation between the driving sprocket 12 and the driven sprocket 46, the position of the axis of rotation 66 for the idler sprocket 22 is fixed at the intersection of the arc 67 with another arc 71 that is struck by a radius formed between the axes of rotations 63 and 66 for the driven and idler sprockets 46,22, respectively, with the center of the arc 71 fixed at the driven sprocket axis of rotation 63.

INDUSTRIAL APPLICABILITY

Thus, the invention provides a power transfer apparatus that overcomes the need imposed through prior art devices to constantly adjust and tinker with chain tension, idler positions, and the like as the separation between the driving sprocket and the driven sprocket is varied to meet different industrial conditions.

What is claimed is:

1. A chain drive comprising a driving sprocket, a driving arm for rotatably supporting said driving sprocket, a driving eccentric idler rotatably mounted on said driving arm for selective offset relative to said driving arm and spaced from said driving sprocket, an idler sprocket rotatably mounted on said driving arm, spaced from said driving sprocket and said driving eccentric idler, a driven arm pivotally joined to said idler sprocket for movement relative to said driving arm in a plane that is parallel with said idler sprocket, a driven eccentric idler rotatably mounted on said driven arm for selective offset relative to said driven arm and spaced from said idler sprocket, a driven sprocket rotatably mounted on said driven arm, spaced from said idler sprocket and said driven eccentric idler, and a chain engaged by each of said sprockets and said eccentric idlers, said eccentric idlers offsets maintaining a predetermined tension in said chain as said driven arm is moved relative to said driving arm.

2. A chain drive according to claim 1, wherein said driving eccentric idler further comprises a fastener, a bushing mounted on said fastener, said bushing having an eccentric bore formed therein to enable said bushing to be moved relative to said driving arm, said driving eccentric idler being rotatably mounted on said bushing.

3. A chain drive according to claim 1, wherein said driven eccentric idler further comprises a fastener, a bushing mounted on said fastener, said bushing having an eccentric bore formed therein to enable said bushing to be moved relative to said driving arm, said driven eccentric idler being rotatably mounted on said bushing.

* * * * *